R. H. HUDGENS.
Harrow and Sower.
No. 166,381. Patented Aug. 3, 1875.
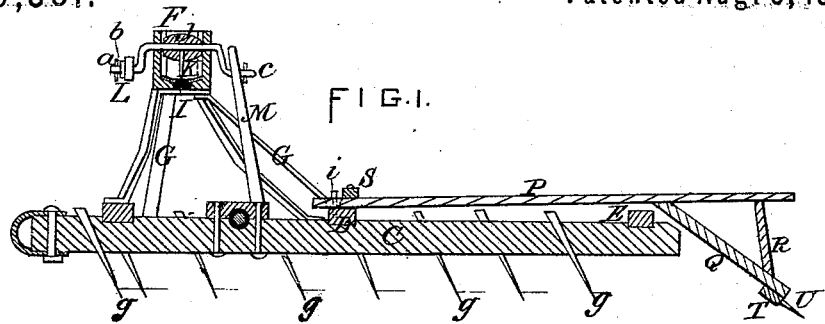
FIG. I.
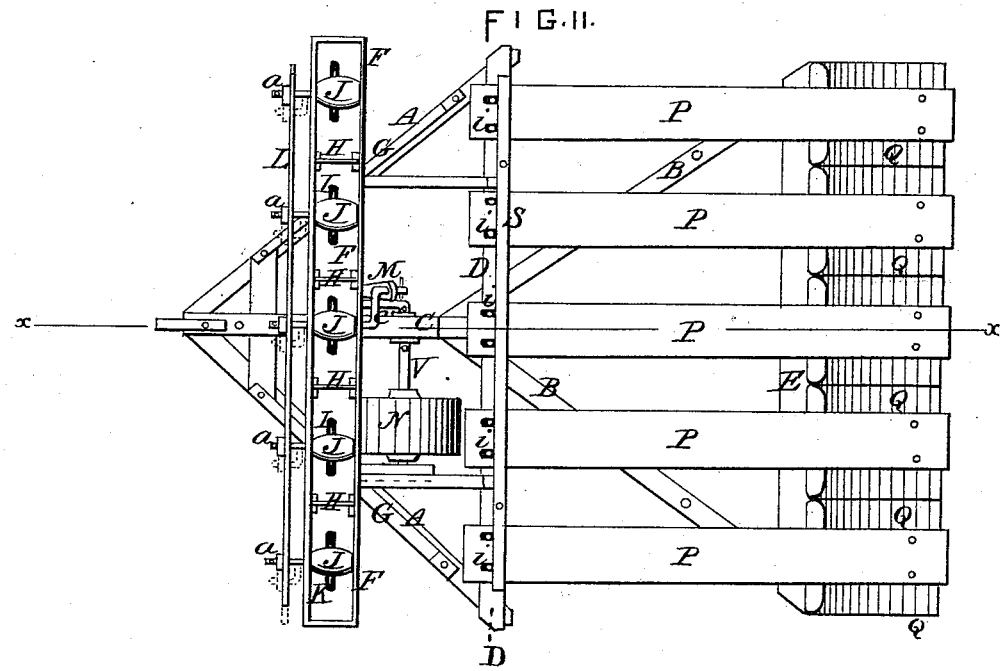
FIG. II.
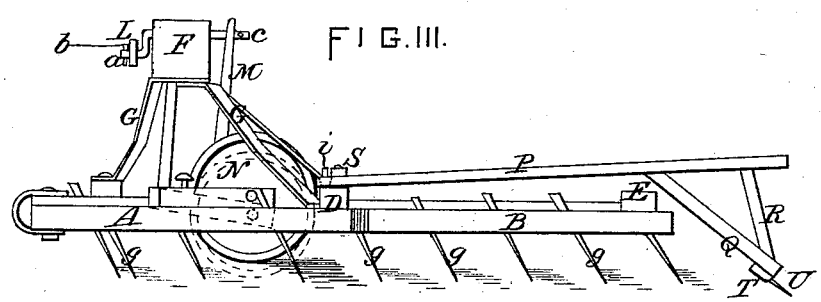
FIG. III.
WITNESSES
F. B. Townsend
J. H. Rutherford
FIG. IV.
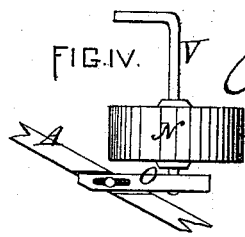
INVENTOR.
Robert H. Hudgens,
By Johnson and Johnson,
his Attorneys.

UNITED STATES PATENT OFFICE.

ROBERT H. HUDGENS, OF LAURENS COURT-HOUSE, SOUTH CAROLINA.

IMPROVEMENT IN HARROWS AND SOWERS.

Specification forming part of Letters Patent No. 166,381, dated August 3, 1875; application filed May 20, 1875.

*To all whom it may concern:*

Be it known that I, ROBERT H. HUDGENS, of Laurens Court-House, in the county of Laurens and State of South Carolina, have invented certain new and useful Improvements in Combined Harrow and Sower; and I do hereby declare that the following is a full, clear, and exact description thereof, which will enable others skilled in the art to which it pertains to make and use the same, reference being had to the accompanying drawing and to the letters of reference marked thereon, which form a part of this specification.

The invention relates to a combined harrow and sower, which is designed for sowing various kinds of seeds and pulverent fertilizers, and for pulverizing and smoothing the ground in a more perfect and satisfactory manner than analogous agricultural machines heretofore devised.

The invention consists, first, in the combination, with a harrow, of an elevated seed-box or trough, which is divided into compartments by means of removable partition-plates, each of which compartments contains an oscillating or rocking toothed distributing-shaft, the entire series of which are connected on one side of the seed-box by a parallel or horizontal connecting-bar, so as to enable them to be actuated by a single ground-wheel, the crank-shaft of which is connected with the crank of the central distributing-shaft by means of a pitman. The ground-wheel is journaled at one end of its axle in a hinged arm, so as to permit it to rise and fall in order to conform with the undulating surface or inequalities of the ground over which the machine is drawn. The invention also consists in the provision of yielding or rising-and-falling drag-boards or plates, which are affixed obliquely to horizontal hangers or arms, the forward ends of which are confined between a transverse bar of the harrow-frame and a top-pressure bar by means of spikes or pins, so that the hangers and the drag-plates are permitted to rise to a sufficient extent for riding over clods and ruts or hills, the pressure of the drag-plates being, however, at no time entirely removed from the ground, as the top confining-bar acts as a pressure-bar to cause the drag-plates to bear upon the ground for breaking clods and pulverizing the same. Another new feature constitutes the combination, with the rearwardly-extending rising-and-falling drag-bars, provided with oblique drag-boards, of a rake attached to the end of each bar, and with teeth having the same direction as said boards with respect to the surface of the ground, whereby to rake and smooth the ground by the same drag-bars.

In the accompanying drawings, Figure 1 represents a vertical longitudinal section of a machine embracing my invention; Fig. 2, a top view of the same; Fig. 3, a side elevation; Fig. 4, a top view of the ground-wheel, its crank, and the pivoted arm carrying one of the bearings of said wheel.

In the drawings, letters A and B denote two triangular or V-shaped harrow-frames, provided with inclined teeth $g$, and connected by means of a continuous central beam, C, extending the entire length of both frames. A transverse bar, D, connects the rear ends of the side wings of the front harrow-frame to the front ends of the rear frame, and the latter is also connected with the central bar by a rear transverse bar, E. At a suitable elevation above the front harrow-frame, so as to avoid contact with stumps and other obstructions, there is arranged a long seed-box or trough, F, which is supported or sustained by means of oblique braces G, attached at different points of the harrow-frame. Said box is divided into compartments by means of vertical removable partition-plates H, which are let into guides in such a manner as to be readily removed when the box or seed-trough is designed to contain a single kind of seed. The bottom of the box is apertured as shown at I, and above each aperature there is arranged an oscillating shaft, J, which is journaled in the sides of the box and carries fingers or pins, K, that serve to work the seed or other substances through the openings in the box when the shaft is oscillated. The entire series of distributing-shafts are connected by means of a parallel or horizontal connecting-bar, L, which is applied to the crank-ends $a$ of each distributing-shaft. The connection between the cranks and bar is effected by passing the cranks through holes in the bar and fitting a pin, $b$, through the projecting part of the crank; thus the various distributing-shafts can be readily detached from the connecting-bar whenever it is desired to stop the operation of either one of the same. The central distributing-shaft is provided with an additional crank, c, which is, by means of a pitman, M, connected with the crank-shaft V of a ground-wheel, N. One end of said wheel-shaft is journaled in the central beam of the harrow-frame, and the other one in an arm. O, pivoted or hinged at its front end to the frame. Thus the ground-wheel is free to rise and fall to conform with inequalities of the ground, and the distributing mechanism will be in operation whatsoever be the position of the harrow-frame. To the middle transverse-bar D of the harrow-frame are connected the forward ends of a series of rearwardly hangers or horizontal arms, P, the rear ends of which project beyond the rear connecting-bar of the harrow-frame, and carry each an inclined or obliquely-arranged drag-board or plate, Q, the lower or depressed end of which is attached to a pendent arm, R, of the hanger P. The drag-boards are caused to assume an inclined position in respect to the ground, and when drawn over the latter they will serve to pulverize the clods left undisturbed by the harrow-teeth, and to cover the seeds or materials distributed over the surface of the ground by the sowing mechanism in front. The drag-boards will also tend to leave the ground perfectly level or smooth and pressed down upon the seeds. The forward ends of the hangers of the drag-boards are fitted on spikes or retaining-pins, i, on the top of the bar D, and at a suitable distance above the hanger-arms there is held a retaining or pressure bar, S, which serves to exert the requisite pressure upon the drag-arms for limiting the vertical movement of the same. The drag-bars are free to rise to a suitable extent for riding or gliding over clods or obstructions, but in doing so the pressure-bar, by exerting a pressure upon or limiting the movement of the hanger-arms, will cause the drag-boards carried by the same to press or bear upon the ground, thus insuring a perfect pulverization or breakage of all clods. When deemed necessary I propose to attach a head, T, armed with rearwardly-extending teeth U, to the rear depressed ends of the drag-boards, this attachment acting as a rake, and raking or leveling the ground in a perfect manner. The rakes can be readily attached to or detached from the drag-boards by providing simple fastening devices.

I claim—

1. In a combined sower and harrow, the combination of an elevated partitioned seed box or trough, F, a series of oscillating toothed distributing-shafts, J, a connecting and operating bar, L, a central crank-shaft, c, a pitman, M, and a rising-and-falling or self-adjusting ground-wheel, N, having a crank-shaft, V, all constructed and relatively arranged as herein shown and described.

2. The combination of the inclined drag-boards Q, and self-adjusting drag-bars P, with the harrow-frame and sowing mechanism, substantially as herein described.

3. The combination of the pressure-bar S, harrow connecting-bar D, and retaining-pins i, with the drag-boards and hangers, as and for the purpose described.

4. The combination, with the pivoted rising-and-falling drag-bars P, provided with the oblique drag-boards Q, of a rake, T U, attachable to the end of each board with the teeth U, having the same direction as the boards Q with respect to the surface of the ground, as and for the purpose herein set forth.

5. The combination, with the harrow, the seeder, and fertilizer-distributer, of the ground-wheel N, having one of its bearings in the pivoted arm O, and the other in the frame C, whereby the cranked end V of the axle is held rigid while the bearing O and wheel have sufficient freedom to rise and fall without interrupting the connection of the driving-crank with the planting device.

In testimony that I claim the foregoing as my own, I have affixed my signature in presence of two witnesses.

R. H. HUDGENS.

Witnesses:
J. P. SIMPSON,
RICHARD C. WATTS.